United States Patent [19]

Hirano

[11] 4,344,492
[45] Aug. 17, 1982

[54] AUTOMATIC COMBINATION WEIGHING MACHINE WITH IMPROVED ZERO-POINT CORRECTION

[75] Inventor: Takashi Hirano, Kobe, Japan

[73] Assignee: Yamato Scale Co. Ltd., Hyogo, Japan

[21] Appl. No.: 224,444

[22] Filed: Jan. 12, 1981

[30] Foreign Application Priority Data

Apr. 14, 1980 [JP] Japan .................................. 55-2895

[51] Int. Cl.³ ..................... G01G 19/04; G01G 19/00; G01G 13/14; B07C 5/16
[52] U.S. Cl. ..................................... 177/25; 177/145; 177/165; 209/592
[58] Field of Search ......................... 177/25, 145, 165; 209/592-596

[56] References Cited
U.S. PATENT DOCUMENTS 2,802,658 8/1957 Hensgen et al. ......................... 177/1
3,708,025 1/1973 Soler et al. .............................. 177/1
3,939,928 2/1976 Murakami et al. .................. 177/1 X
4,206,822 6/1980 Mazzucchelli ........................ 177/25

Primary Examiner—George H. Miller, Jr.
Attorney, Agent, or Firm—Eugene E. Geoffrey, Jr.

[57] ABSTRACT

A combination weighing machine, which is typically used for packing a plurality of articles in each bag or the like, including a plurality of weighing balances for weighing a plurality of articles each at the same time, and arithmetic means for selecting some of these weighing balances so that the total weight of the articles thereon falls within a predetermined allowable range, the machine also includes zero-point correction means arranged such that, by applying a zero-point correction command signal from the outside, the loading operation of a selected balance is inhibited and, after the unloading operation, this balance is left vacant, and that, under such condition, the weight signal output from this balance is cancelled or nullified prior to arrival at the arithmetic means.

4 Claims, 8 Drawing Figures

AUTOMATIC COMBINATION WEIGHING MACHINE WITH IMPROVED ZERO-POINT CORRECTION

This invention relates to an automatic combination weighing machine, especially to a zero-point correction system used with such machine.

The weighing device which is generally referred to as a "combination balance" or "combination weighing device" is used for extracting and collecting a plurality of articles from a group of articles, such as cakes, fish and vegetables, having relatively large variances in respective weights, so that the extracted group has a weight which is nearly equal to a predetermined intended weight. A typical example of such a device is disclosed in U.S. Pat. No. 3,939,928, and another example which is improved over that United States Patent in arithmetic arrangement is disclosed in the pending U.S. patent application Ser. No. 102,660 filed Dec. 12, 1979, Australian Patent Application No. 53,428/79 filed Dec. 4, 1979, British Patent Application No. 79 42517 filed Dec. 10, 1979, French Patent Application No. 79 30299 filed Dec. 11, 1979 and German Patent Application No. P2949781.2 filed Dec. 11, 1979. In these devices, a plurality of articles or groups of articles are weighed individually by the same number of weighing balances at the same time, all mathematical combinations of the respective weights are summed up respectively and the respective sums are compared with the predetermined intended weight. When the combined weight is within a predetermined allowable range from the predetermined intended weight, the articles on the corresponding balances are collected for packing in a single package.

The electric output of each weighing balance, representing the measured weight, may vary due to zero-point drift which is mainly caused by change of circumferential conditions such as temperature and humidity, and contamination of the weighing cradle with flakes of articles. Accordingly, each balance must be corrected to its zero-point frequently in order to maintain its accuracy and reliability. In the prior art devices, however, it has been necessary to shut off the whole device operation during the prosecution of zero-point correction and, in addition, to remove the articles from each balance resulting in a troublesome and time-consuming manual operation.

Accordingly, an object of this invention is to provide a novel and improved zero-point correction system for combination weighing devices, which can execute all operations required for this purpose in fully automatic fashion in cooperation with the mechanism for loading and unloading each weighing balance.

To attain the above mentioned object of this invention, the automatic combination weighing machine according to this invention includes a plurality of weighing units each having a weighing crable for carrying articles to be weighed and weight sensing means for producing an electric signal representative of the weight of said articles, each cradle being provided with an exhaust gate controlled by a first control signal to exhaust the content into collecting means. Article supply means having a plurality of exit ports facing respectively the weighing cradles of the weighing units are provided for supplying the articles from a source to the respective weighing cradles, each exit port having an exhaust gate controlled by a second control signal. The device also includes means for coupling the output signals from the weight sensing means through normally-open switches respectively to summing means for summing up these signals to produce a sum signal, means for comparing the sum signal with a predetermined range of weight to produce a comparison output when the sum is within said range, combination control means for generating a predetermined set of combinations of outputs successively to close the normally-open switches in accordance with these combinations, memory means responsive to the comparison output of said comparing means to store the current combination outputs of the combination control means, and gate control means responsive to the content of the memory means to produce the first and second gate control signals for the corresponding weighing units.

According to a feature of this invention, a zero-point correction device responsive to an actuation signal for cancelling any input level to produce a zero level output is inserted in each signal path between the weight sensing means and the summing means. Furthermore, means are employed for providing a zero-point correction command signal optionally, and means responsive to the zero-point correction command signal for inhibiting application of the second control signal and sensing application of the first control signal to actuate the zero-point correction device.

These and other objects and features of this invention will be described hereinunder in more detail with reference to some embodiments as shown in the accompanying drawings.

IN THE DRAWINGS

Throughout the drawings, like reference numerals are used to denote corresponding structural components.

Figure 1:
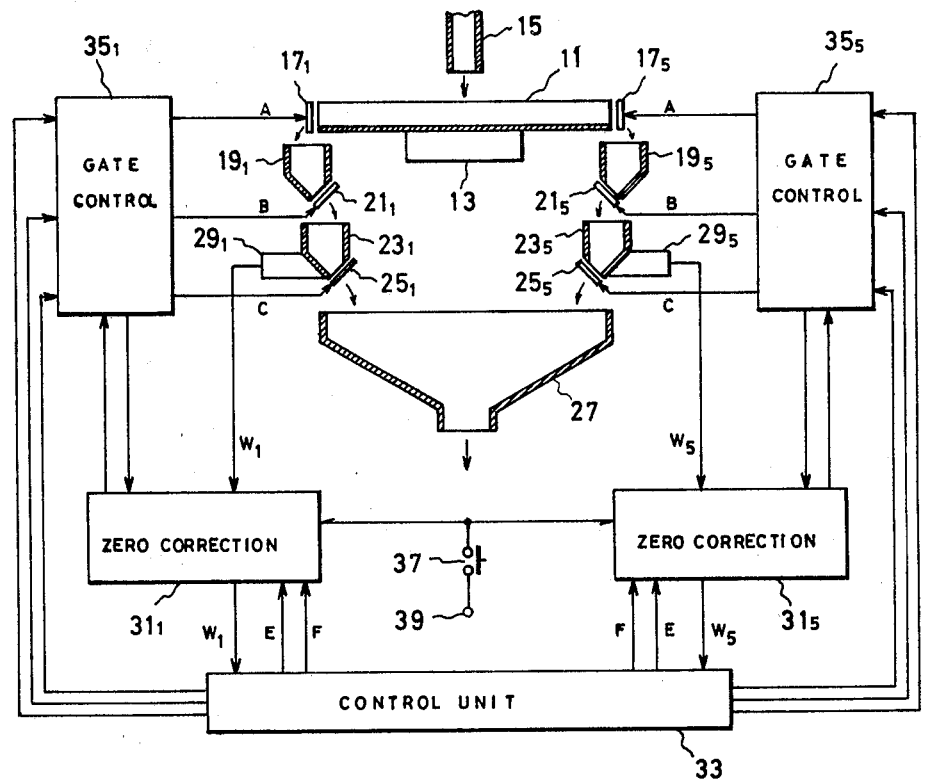
FIG. 1 is a schematic block diagram representing the general configuration of an automatic combination weighing machine including the zero-point correction system according to this invention.

Referring to FIG. 1, there is shown a general arrangement of various components of a typical automatic combination wighing machine in which the zero-point correction system of this invention is embodied. This machine is of the eight head circular type, which has eight similar weighing units each accompanied with an article loading and unloading system and a zero-point correction system, and a common central control unit 33. In the drawing, the diametrically opposing first and fifth heads of the eight heads are only shown and the reference numerals have suffixes 1 and 5, correspondingly. It is a matter of course that the number of heads is not a matter of confinement but is a matter of selection by the designer.

The article loading and unloading system includes a common vibration feeder 11 consisting of a substantially flat circular disc having a peripheral wall. The feeder 11 is provided with a vibrator 13 for applying circumferential vibration to the disc, so that, when the articles are supplied onto the central portion of the disc from a suitable source 15, they are caused to move spirally outwardly to the peripheral portion. The peripheral wall of the feeder has eight exit ports having gates 17, respectively, which are normally closed but opened under control of a gate control signal A, respectively.

Under each gate 17 of the feeder 11, a loading vessel 19 is provided having an outlet at the bottom, which is provided with a gate 21 which is normally closed but is opened under control of a gate control signal B. Under each gate 21, there is located a weighing cradle 23 of the weighing unit. The cradle 23 is provided also with a gate 25 at its bottom opening, which is closed normally but is opened under control of a gate control signal C. The gates 25 of all the weighing units face an underlying collection hopper 27.

Each weighing cradle 23 is provided with a weight sensor 29, such as load cell, for detecting the weight of articles on the cradle 23 to produce an electric signal W indicative of said weight and applied through a zero correction device 31 to the central control unit 33. The gate control signals A, B and C are generated in the central control unit 33 and supplied through each gate control unit 35 to the abovementioned gates 17, 21 and 25, respectively.

A terminal 39 coupled to a suitable potential source (not shown) is connected through a normally-open push-button switch 37 to the respective zero correction devices for applying a zeropoint correction command signal.

Figure 2:
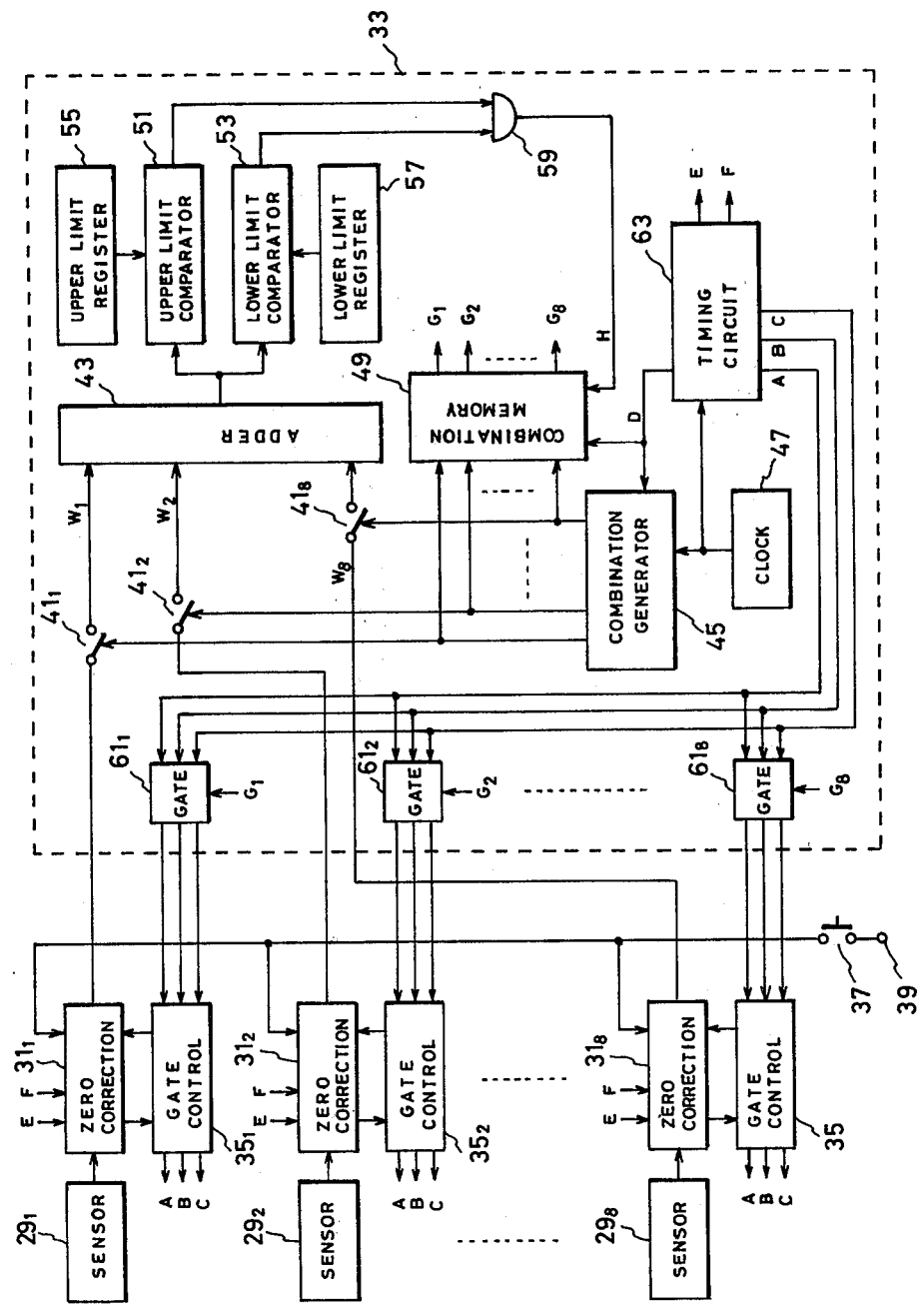
FIG. 2 is a block diagram representing a circuit embodiment of the automatic combination weighing machine in which this invention is embodied.

An example of electric circuit configuration of the arrangement of FIG. 1 is shown in FIG. 2. The outputs $W_1, W_2, \ldots W_8$ of the weight sensors $29_1, 29_2, \ldots 29_8$ of the eight heads of weighing system are coupled respectively through the zero correction devices $31_1, 31_2, \ldots 31_8$ and normally-open switches $41_1, 41_2, \ldots 41_8$ to a common adder circuit 43. The normally-open switches $41_1, 41_2, \ldots 41_8$ each have a control terminal connected to a corresponding one of eight output terminals of a combination generator 45. The combination generator 45 is driven by clock pulses from a clock pulse generator 47 to produce a predetermined set of combinations of output signals from its selected output terminals, in clocked fashion. For example, if the predetermined set of combinations are complete mathematical combinations of the eight outputs, the combination generator may be an eight-bit binary counter having a control input coupled to the clock pulse generator 47 and eight parallel outputs coupled respectively to the corresponding output terminals. In this case, the logic HIGH level or binary "1" serves as the "output signal" from each output terminal of the combination generator 45. As widely known by those skilled in the art, the total number of such combinations is $2^8-1=512$ and the combination generator 45 produces 512 sets of output signals successively in synchronism with the applied clock pulses.

The adder circuit 43 sums up the weight signals W supplied through the switches 41 closed under control of the combination generator 45, to produce a sum output. The sum output is applied to an upper limit comparator 51 and to a lower limit comparator 53. The upper and lower limit comparators 51 and 53 have second inputs coupled respectively to the outputs of upper and lower limit registers 55 and 57, respectively. The upper and lower limit registers 55 and 57, each having an input device such as conventional digital keyboard (not shown), store predetermined upper and lower limits of allowable range of the weight of combined articles, respectively. The comparators 51 and 53 compare the sum output of the adder circuit 43 with the contents of the upper and lower limit registers 55 and 57, respectively, to produce outputs at the same time when the sum is within the allowable range. These outputs are coupled to an AND gate 59 and the output H of the AND gate 59 is coupled to a set input of a combination memory 49.

Figure 3:
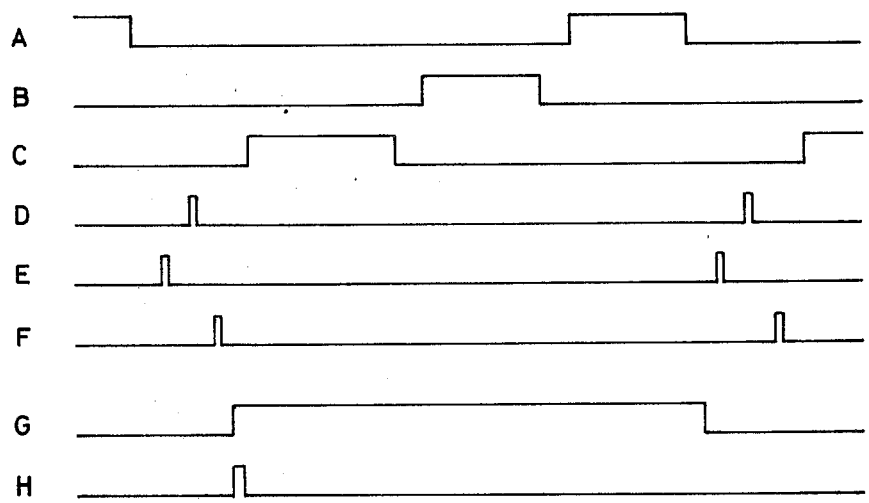
FIG. 3 is a waveform diagram representing some control signals used for operation of the circuit of FIG. 2.

The combination memory 49 has eight memory cells coupled respectively to the corresponding outputs of the combination generator 45 for storing the outputs of the combination generator 45 in response to the output H of the AND gate 59, and corresponding output devices for reading out the content of the memory cells as gate pulses G having a predetermined duration as shown in FIG. 3 in response to HIGH level contents. The gate pulses G are coupled respectively to control inputs of eight gate circuits 61.

The central control unit 33 further includes a timing circuit 63 which produces timing signals A, B, C, D, E and F as shown in FIG. 3 under control of the clock pulses supplied from the clock pulse generator 47. The signals A, B and C are coupled through the respective gate circuits $61_1, 61_2, \ldots 61_8$ and the corresponding gate control units $35_1, 35_2, \ldots 35_8$ to the gates 17, 21 and 25 of the corresponding article loading and unloading systems as described above with reference to FIG. 1, to open these gates for the durations thereof. The signal D is a reset signal for clearing the contents of the combination generator 45 and the combination memory 49 at the beginning of each cycle of combination. The arrangement as above-described is well known in the art and, therefore, need not be described further. Now, the description will be made on the zero-point correction system in which the invention is embodied.

Figure 4:
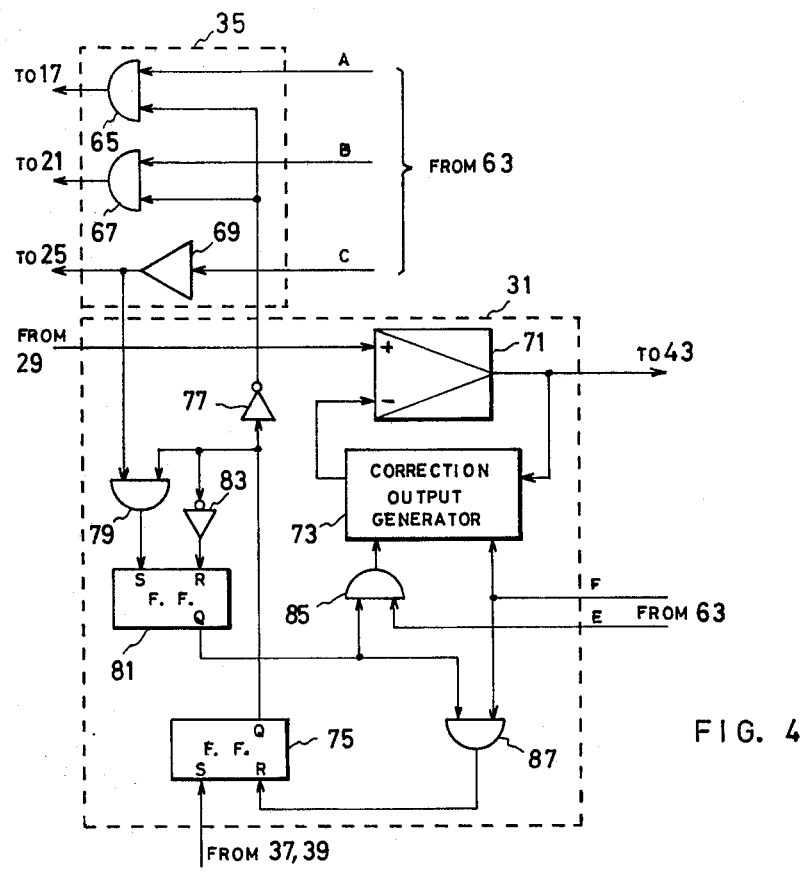
FIG. 4 is a logic diagram representing an embodiment of the zero-point correction system according to this invention.

A preferred embodiment of circuit configuration of each zero-point correction device 31 is shown in FIG. 4 with the associated gate control unit 35. The gate control unit 35 includes two AND gates 65 and 67 and an amplifier 69 having inputs for receiving the timing signals A, B and C, respectively, supplied from the timing circuit 63, and outputs coupled respectively to the gates 17, 21 and 25 of the corresponding loading and unloading system.

The zero-correction device 31 includes an operation amplifier 71 having a non-inversion input coupled to the output of the weight sensor 29 (FIGS. 1 and 2) and an output coupled through the normally-open switch 41 to the adder circuit 43 (FIG. 2). The output of the amplifier 71 is also fed back through a correction output generator 73 as described later to its inversion input. The device 31 further includes a flip-flop 75 having a set input S coupled through the switch 37 to the potential source 39 (FIGS. 1 and 2) and a Q output coupled through an invertor 77 to the second inputs of the AND gates 65 and 67 of the gate control unit 35. The Q output of the flip-flop 75 is also coupled to an AND gate 79 with another input coupled to the output of the amplifier 69 of the gate control unit 35 and an output coupled to a set input S of another flip-flop 81. The output of the flip-flop 75 is further coupled through an invertor 83 to a reset input R of the flip-flop 81. The Q output of the flip-flop 81 is coupled to one input of two AND gates 85 and 87, the second inputs of which are coupled to the timing circuit 63 for receiving the start and stop signals E and F as shown in FIG. 3. The output of the AND gate 87 is coupled to a reset input R of the flip-flop 75.

Figure 5:
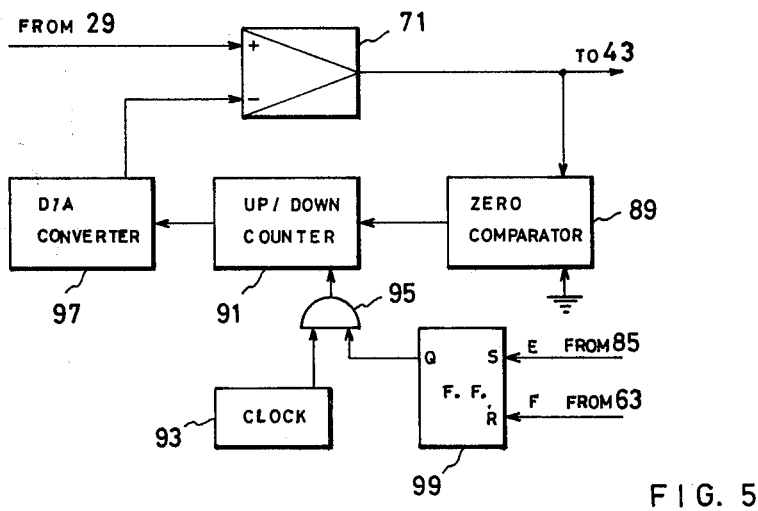
FIG. 5 is a block diagram representing an example of the correction output generator in the system of FIG. 4.

A preferred example of the correction output generator circuit 73 is shown in FIG. 5. The correction output generator 73 includes a zero comparator 89 having a first input coupled to the output of the operation amplifier 71 and a second or zero level reference input as shown by a ground mark. The comparator 89 serves a function of comparing the output of the operation amplifier 71 with the reference zero level to produce an output representing "plus" when the former is above zero or "minus" when it is below zero. The "plus" and "minus" outputs of the zero comparator are applied to a control terminal of an up/down or reversible counter 91, which counts clock pulses supplied from a clock pulse generator 93 through an AND gate 95, to drive the counter 91 upwards and downwards, respectively. The count output of the counter 91 is converted into an analog quantity or voltage level by a digital-to-analog (D/A) convertor 97 and applied to the inversion input of the operation amplifier 71. The second input of the AND gate 95 is coupled to the Q output of a flip-flop 99 having a set input S coupled to the output of the AND gate 85 and a reset input R coupled to the timing circuit 63 for receiving the stop signal F (FIG. 3).

Now, the operation of the zero-point correction system as shown in FIGS. 4 and 5 will be described in detail. It should be noted previously that "zero correction" means an operation for putting the input weight signal of the adder circuit 43 at zero level when the corresponding weighing cradle has been unloaded but not yet loaded again, that is, it is in a vacant state.

In case of effecting zero-point correction, one may push the push-button switch 37 (FIGS. 1 and 2) for a short time to apply a zero-correction command pulse to the set input S of the flip-flop 75 to drive it into "set" state, during the normal operation of the combination weighing machine. Then, the Q output of "high" level is applied through the invertor 77 to the AND gates 65 and 67 to disable them. Thus, the gates 17 and 21 of the loading system are left closed and no article will be loaded thereafter in the weighing cradle 23 (FIG. 1) even if the loading signals A and B are received in the gate control unit 35. Therefore, after the cradle 23 is unloaded by the unloading signal C supplied through the amplifier 69 to the gate 25, it is left vacant to be ready for zero correction operation.

The unloading signal C is also applied from the amplifier 69 to the AND gate 79 together with the "high" level Q output of the flip-flop 75, which applies, in turn, its output to the set input of the flip-flop 81 to put it in "set" state. Then, the "high" level Q output of the flip-flop 81 is applied to the AND gates 85 and 87. Under such ready condition, the start pulse E is applied from the timing circuit 63 through the AND gate 85 to the set input of the flip-flop 99 of the correction output generator 73, to drive it into "set" state. Then, the flip-flop 99 applies a "high" level Q output to the AND gate 95, thereby passing a train of clock pulses from the clock pulse generator 93 to the up/down counter 91 to be counted therein.

Assuming that the output of the operation amplifier 71 has exhibited some positive value regardless of the vacancy of the corresponding weighing cradle, the zero comparator 89 produces an output indicative of "plus" to drive the counter 91 upwards or forwards. Then, the counter 91 counts the clock pulses additively and the count is successively converted into a corresponding voltage level by the D/A convertor 97 and subtracted from the input level at the non-inversion input of the operation amplifier 71. As a result, if the output of the amplifier 71 has dropped below zero level, the zero comparator 89 produces an output indicative of "minus" to drive the up/down counter 91 downwards or backwards. Then, the counter 91 begins to effect downward or subtractive counting to reduce the output level of the D/A convertor 97, thereby drawing the output level of the amplifier 71 toward the zero level. After some repetition of such correction operations, the output of the operation amplifier 71 is put at the zero level, and the zero-point correction is completed.

Upon completion of the zero correction operation, the stop signal F (FIG. 3) is applied from the timing circuit 63 (FIG. 2) to the reset input R of the flip-flop 99 to drive it into "reset" state. Then, the Q output of the flip-flop 99 turns to "low" level to disable the AND gate, thereby resetting the counter 91 and disabling the zero correction operation. The stop signal F is also applied through the enabled AND gate 87 to the reset input R of the flip-flop 75 to drive it into "reset" state. Then, the "low" level Q output is applied through the invertors 77 and 83 to the AND gates 65 and 67 and to the reset input of the flip-flop 81, respectively, to enable the AND gates and return the flip-flop to "reset" state. Under this condition, the loading signals B and A are supplied through the AND gates 67 and 65 to the gates 21 and 17, to effect loading of the weighing cradle 23 with new articles. Thereafter, the normal operation of the combination weighing machine is continued. It is to be noted that the time interval between the start and stop signals E and F is previously set up so that a sufficient zero-point correction is obtained within this period. As the AND gate 85 is disabled by the "reset" state of the flip-flop 81, the subsequent start signals E cannot initiate the zero correction operation.

Figure 6:
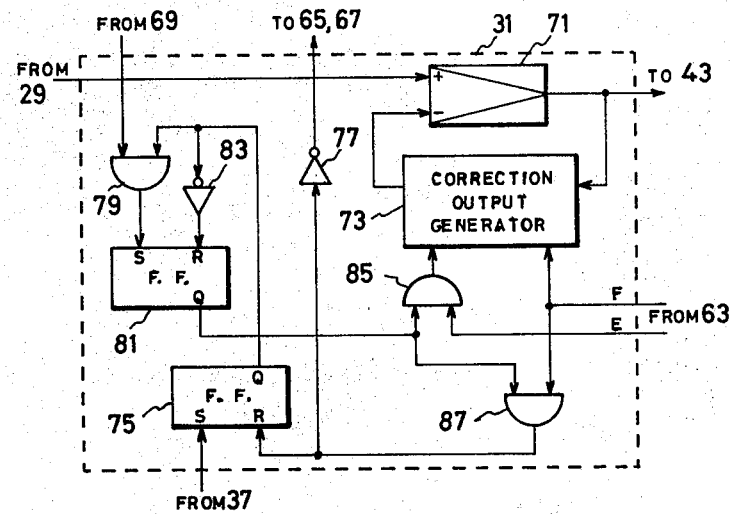
FIG. 6 is a logic diagram representing a modification of the zero-point correction system of FIG. 4.

FIG. 6 shows a first variation of the zero-point correction device 31 of FIG. 4. As readily understood, this circuit is quite similar to that of FIG. 4, except that the disabling signal of the AND gates 65 and 67 is supplied from the AND gate 87 but not from the flip-flop 75. Accordingly, the operation of this circuit is also similar to that of FIG. 4, except that the AND gates 65 and 67 are disabled after unloading of the weighing cradle 23 is initiated.

Figure 7:
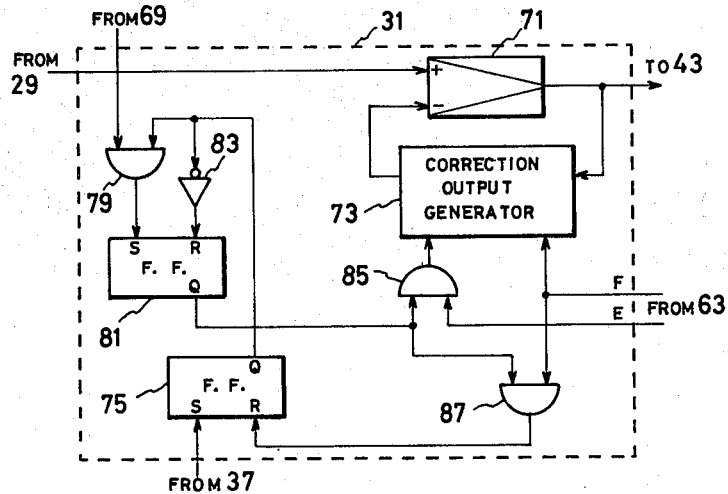
FIGS. 7 and 8 are similar diagrams representing other modifications of the system of FIG. 4.
Figure 8:
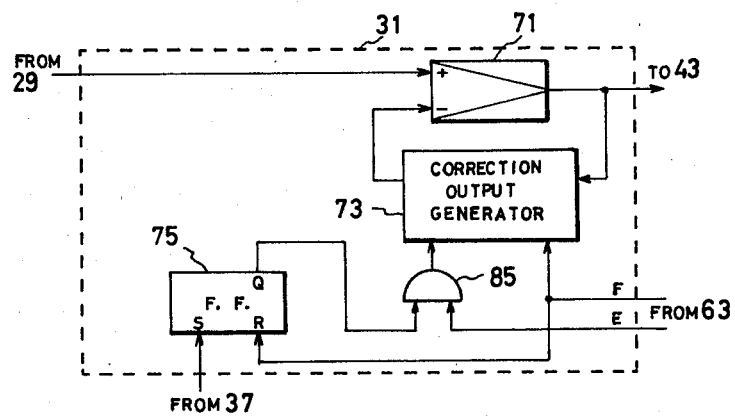

As readily understood, the arrangements of FIGS. 4 and 6 include the AND gates 65 and 67 in the gate control unit 35 for automatically inhibiting to load again the unloaded cradle 23. However, if a suitable device is provided otherwise for sensing the unloading action of the weighing cradle to disable these AND gates, the circuit of FIG. 6 can be simplified as shown in FIG. 7. While the circuit of FIG. 7 includes means for sensing the unloading action to permit reception of the start signal E, it can be further simplified as shown in FIG. 8 if such means is provided otherwise for control of application of the signal E. As the operations of these modifications can be easily understood from the above description, no further description will be made thereon.

It should be noted that the above description has been made about a few embodiments for illustrative purposes only, and that various modifications and changes can be made within the scope of this invention as defined in the appended claim. For example, the zero correction command signal may be applied automatically and periodically by use of a timing device, such as a timer.

What is claimed is:

1. An automatic combination weighing machine, comprising a plurality of weighing units each including a weighing cradle for carrying articles to be weighed and weight sensing means for producing an electric signal indicative of the weight of said articles, said weighing cradle having an exhaust gate controlled by a first control signal for exhausting the content into collecting means, supply means having a plurality of discharge gates facing respectively said weighing cradles of said weighing units and controlled by a second control signal for supplying said articles from a source of articles to said weighing cradles, means for transferring the output signals of said weight sensing means through normally-open switches each having a control terminal, respectively, to a common summing device for summing up the incoming signals to produce a sum signal, means coupled to said summing device for comparing said sum signal with a predetermined range of weight to produce a comparison output when the sum is within said range, combination control means having a plurality of output terminals coupled respectively to the control terminals of said normally-open switches for producing outputs at said output terminals in accordance with a predetermined set of combinations to close the corresponding normally-open switches successively, memory means having a plurality of input terminals coupled respectively to the output terminals of said combination control means, corresponding output terminals and a control input terminal for receiving said comparison output, for responding to said comparison output to store the outputs of said combination control means and, at the same time, discharge the content from the corresponding output terminals for a predetermined period of time, and gate control means for responding to the outputs of said memory means to supply said first and second control signals to the corresponding ones of said weighing units, a plurality of zero-point correction devices inserted respectively in the signal paths for transferring the outputs of said weight sensing means to said summing device, for responding to an energizing signal to cancel its input level to produce a zero-level output, means for producing a zero-point correction command signal, and correction control means coupled to said gate control means and said zero-point correction devices for responding to said zero-point correction command signal to inhibit application of said second control signal and to sense application of said first control signal to apply said energizing signal to said zero-point correction devices.

2. An automatic combination weighing machine according to claim 1, wherein said zero-point correction device includes an operation amplifier having a first input coupled to each of said weight sensing means and an output coupled to said summing device and to its second input through a correction output generator, said correction output generator includes means responsive to said energizing signal for sensing the output level of said operation amplifier to produce an output which changes said output level into a zero level, and said correction control means include gate means inserted in the signal path of said second control signal for responding to said zero-point correction command signal to shut off said signal path, and means responsive to said zero-point correction command signal and said first control signal for applying said energizing signal to said correction output generator.

3. An automatic combination weighing machine according to claim 2, wherein said correction output generator comprises a comparator having a first input coupled to the output of said operation amplifier and a second input coupled to a reference zero level for porducing an output indicative of "plus" when the first input level is higher than said reference zero level or indicative of "minus" when said first input level is lower than said reference zero level, a reversible counter having an input coupled to a clock pulse generator through gate means opened in response to said energizing signal and a control terminal coupled to the output of said comparator for responding to said output indicative of "plus" or "minus" to effect additive or subtractive counting of the input pulses, and a digital-to-analog convertor for converting the count output of said counter and applying it to the second input of said operation amplifier.

4. An automatic combination weighing machine according to claim 2, wherein said correction control means further include means responsive to a deenergizing signal applied after a predetermined time period from said energizing signal for releasing shut-off of said second control signal by said gate means and, at the same time, inhibiting application of said energizing signal to said correction output generator.

* * * * *